(12) United States Patent
Bhogal et al.

(10) Patent No.: US 9,124,725 B2
(45) Date of Patent: *Sep. 1, 2015

(54) TELEPHONY SERVICES OPTIMIZATION THROUGH CALLING PLAN ANALYSIS

(71) Applicant: International Business Machines Corporation, Armonk, NY (US)

(72) Inventors: Kulvir S. Bhogal, Pflugerville, TX (US); Gregory J. Boss, Saginaw, MI (US); Rick A. Hamilton, II, Charlottesville, VA (US); Brian M. O'Connell, Research Triangle Park, NC (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/148,066

(22) Filed: Jan. 6, 2014

(65) Prior Publication Data

US 2014/0119521 A1      May 1, 2014

Related U.S. Application Data

(63) Continuation of application No. 13/035,794, filed on Feb. 25, 2011, now Pat. No. 8,625,764.

(51) Int. Cl.
*H04M 3/42* (2006.01)
*H04M 15/00* (2006.01)
(Continued)

(52) U.S. Cl.
CPC ........ *H04M 15/805* (2013.01); *H04M 15/8044* (2013.01); *H04M 2215/42* (2013.01)

(58) Field of Classification Search
USPC ............ 379/201.02, 114.28, 201.01, 221.02, 379/201.05, 111; 455/552.1, 405, 445, 455/432.3; 370/238
See application file for complete search history.

(56) References Cited

U.S. PATENT DOCUMENTS 5,878,122 A    3/1999   White et al.
5,881,139 A    3/1999   Romines
(Continued)

OTHER PUBLICATIONS

Thjuan Knowlin Addy, USPTO Office Action, U.S. Appl. No. 13/035,794, Notification Date Feb. 15, 2013, 15 pages.
(Continued)

*Primary Examiner* — Thjuan K Addy
(74) *Attorney, Agent, or Firm* — William E. Schiesser; Keohane & D'Alessandro PLLC; Maxine L. Barasch

(57) ABSTRACT

Embodiments of the present invention provide optimization of telephone services through telephone calling plan/card analysis. The least expensive rate is found for telephone calls at any given time and/or date, either through static pre-entry of data, or through dynamic querying of rates via a web-based look-up table, and places calls according to an optimized calling plan. Specifically, in a typical embodiment, an outgoing/target telephone number for an intended telephone call is captured, and a corresponding destination geographic region is identified. Based on the geographic region, a calling plan resulting in a lowest price for the telephone call is identified. This is typically accomplished by consulting at least one table (e.g., call information table) that associates (among other things) calling plans and/or calling cards with geographic regions. Once a calling plan and/or calling card is identified/selected, a corresponding set of dialing instructions will be obtained from the table and used to make/place the telephone call.

20 Claims, 5 Drawing Sheets

(51) Int. Cl.
  *H04M 11/00* (2006.01)
  *H04W 4/00* (2009.01)
  *H04W 40/00* (2009.01)
  *G01R 31/08* (2006.01)

(56) References Cited

U.S. PATENT DOCUMENTS

| | | |
|---|---|---|
| 5,953,398 A | 9/1999 | Hill |
| 6,240,169 B1 | 5/2001 | Haskins et al. |
| 6,345,090 B1 * | 2/2002 | Walker et al. ............ 379/114.12 |
| 6,671,359 B1 | 12/2003 | Enzmann et al. |
| 6,748,064 B2 | 6/2004 | Zbib |
| 7,260,208 B2 | 8/2007 | Cavalcanti |
| 8,200,231 B2 * | 6/2012 | Gonen et al. ................ 455/445 |
| 2002/0097853 A1 | 7/2002 | Ouijdani et al. |
| 2005/0281199 A1 | 12/2005 | Simpson et al. |
| 2007/0047707 A1 | 3/2007 | Mayer et al. |
| 2007/0049329 A1 | 3/2007 | Mayer et al. |

OTHER PUBLICATIONS

Thjuan Knowlin Addy, USPTO Final Office Action, U.S. Appl. No. 13/035,794, Notification Date Jun. 12, 2013, 11 pages.

Thjuan Knowlin Addy, USPTO Notice of Allowance and Fee(s) Due, U.S. Appl. No. 13/035,794, Date Mailed Aug. 29, 2013, 16 pages.

* cited by examiner

TELEPHONY SERVICES OPTIMIZATION THROUGH CALLING PLAN ANALYSIS

CROSS-REFERENCE TO RELATED APPLICATIONS

The present patent document is a continuation of U.S. patent application Ser. No. 13/035,794, filed Feb. 25, 2011, entitled "TELEPHONY SERVICES OPTIMIZATION THROUGH CALLING PLAN ANALYSIS", the disclosure of which is incorporated herein by reference.

TECHNICAL FIELD

In general, embodiments of the present invention relate to telephony services optimization. Specifically, embodiments of the present invention relate to the identification of a best/ideal calling plan (e.g., based upon cost) for an intended telephone call.

BACKGROUND

When calling long distance to different states and countries, a user is often faced with a complex decision process. For example, calling cards are often used to call foreign countries in particular since they often provide lower rates than a traditional calling plan might. The complexity of dealing with calling cards is that some cards provide rates that are best for calling one country while, when calling another country, there is often another calling card that provides a better rate. The issue is compounded by calling plan intricacies such as differing rates for differing times of day and/or geographical areas.

SUMMARY

Embodiments of the present invention provide optimization of telephone services through telephone calling plan/card analysis. The least expensive rate is found for telephone calls at any given time and/or date, either through static pre-entry of data, or through dynamic querying of rates via a web-based look-up table, and places calls according to an optimized calling plan. Specifically, in a typical embodiment, an outgoing/target telephone number for an intended telephone call is captured, and a corresponding destination geographic region is identified. Based on the geographic region, a calling plan resulting in a lowest price for the telephone call is identified. This is typically accomplished by consulting at least one table (e.g., call information table) that associates (among other things) calling plans and/or calling cards with geographic regions. Once a calling plan and/or calling card is identified/selected, a corresponding set of dialing instructions will be obtained from the table and used to make/place the telephone call.

A first aspect of the present invention provides a method for optimizing telephony services, comprising: capturing an outgoing telephone number from an intended telephone call; identifying a geographic region to which the intended telephone call is being placed; identifying a calling plan resulting in a lowest price for placing the intended telephone call based on at least one information table, the at least one information table associating geographic regions with calling plans; and implementing the intended telephone call according to the calling plan and a set of dialing instructions also contained in the at least one information table.

A second aspect of the present invention provides a system for optimizing telephony services, comprising: a bus; a processor coupled to the bus; and a memory medium coupled to the bus, the memory medium comprising instructions to: capture an outgoing telephone number from an intended telephone call; identify a geographic region to which the intended telephone call is being placed; identify a calling plan resulting in a lowest price for placing the intended telephone call based on at least one information table, the at least one information table associating geographic regions with calling plans; and implement the intended telephone call according to the calling plan and a set of dialing instructions also contained in the at least one information table.

A third aspect of the present invention provides a computer program product for optimizing telephony services, the computer program product comprising a computer readable storage media, and program instructions stored on the computer readable storage media, to: capture an outgoing telephone number from an intended telephone call; identify a geographic region to which the intended telephone call is being placed; identify a calling plan resulting in a lowest price for placing the intended telephone call based on at least one information table, the at least one information table associating geographic regions with calling plans; and implement the intended telephone call according to the calling plan and a set of dialing instructions also contained in the at least one information table.

A fourth aspect of the present invention provides a method for deploying a system for optimizing telephony services, comprising: providing a computer infrastructure being operable to: capture an outgoing telephone number from an intended telephone call; identify a geographic region to which the intended telephone call is being placed; identify a calling plan resulting in a lowest price for placing the intended telephone call based on at least one information table, the at least one information table associating geographic regions with calling plans; and implement the intended telephone call according to the calling plan and a set of dialing instructions also contained in the at least one information table.

BRIEF DESCRIPTION OF THE DRAWINGS

These and other features of this invention will be more readily understood from the following detailed description of the various aspects of the invention taken in conjunction with the accompanying drawings in which.

Figure 1:
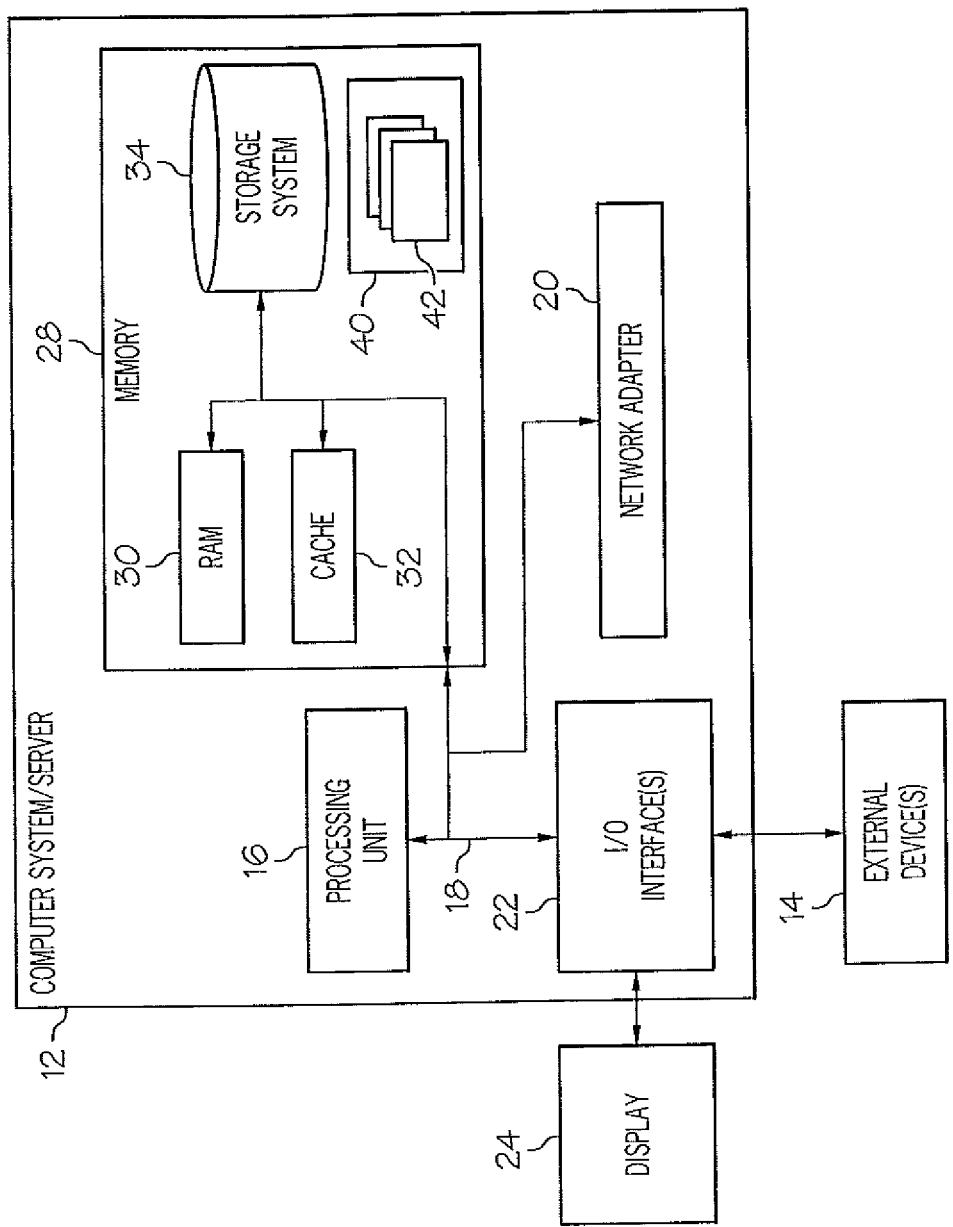
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide optimization of telephone services through telephone calling plan/card analysis. The least expensive rate is found for telephone calls at any given time and/or date, either through static pre-entry of data, or through dynamic querying of rates via a web-based look-up table, and places calls according to an optimized calling plan. Specifically, in a typical embodiment, an outgoing/target telephone number for an intended telephone call is captured, and a corresponding destination geographic region is identified. Based on the geographic region, a calling plan resulting in a lowest price for the telephone call is identified. This is typically accomplished by consulting at least one table (e.g., call information table) that associates (among other things) calling plans and/or calling cards with geographic regions. Once a calling plan and/or calling card is identified/selected, a corresponding set of dialing instructions will be obtained from the table and used to make/place the telephone call.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. In general, program/utility 40 (or similar variants shown in FIG. 2) performs the function of the present invention as described herein. Each of the operating systems, one or more application programs, other program modules, and program data or some combination thereof, may include an implementation of a networking environment. Program modules 42 (or similar variants shown in FIG. 2) generally carry out the functions and/or methodologies of embodiments of the invention as described herein. Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22.

Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Embodiments of the present invention provide an approach for a telephone optimization through calling plan/card analysis.

Figure 2:
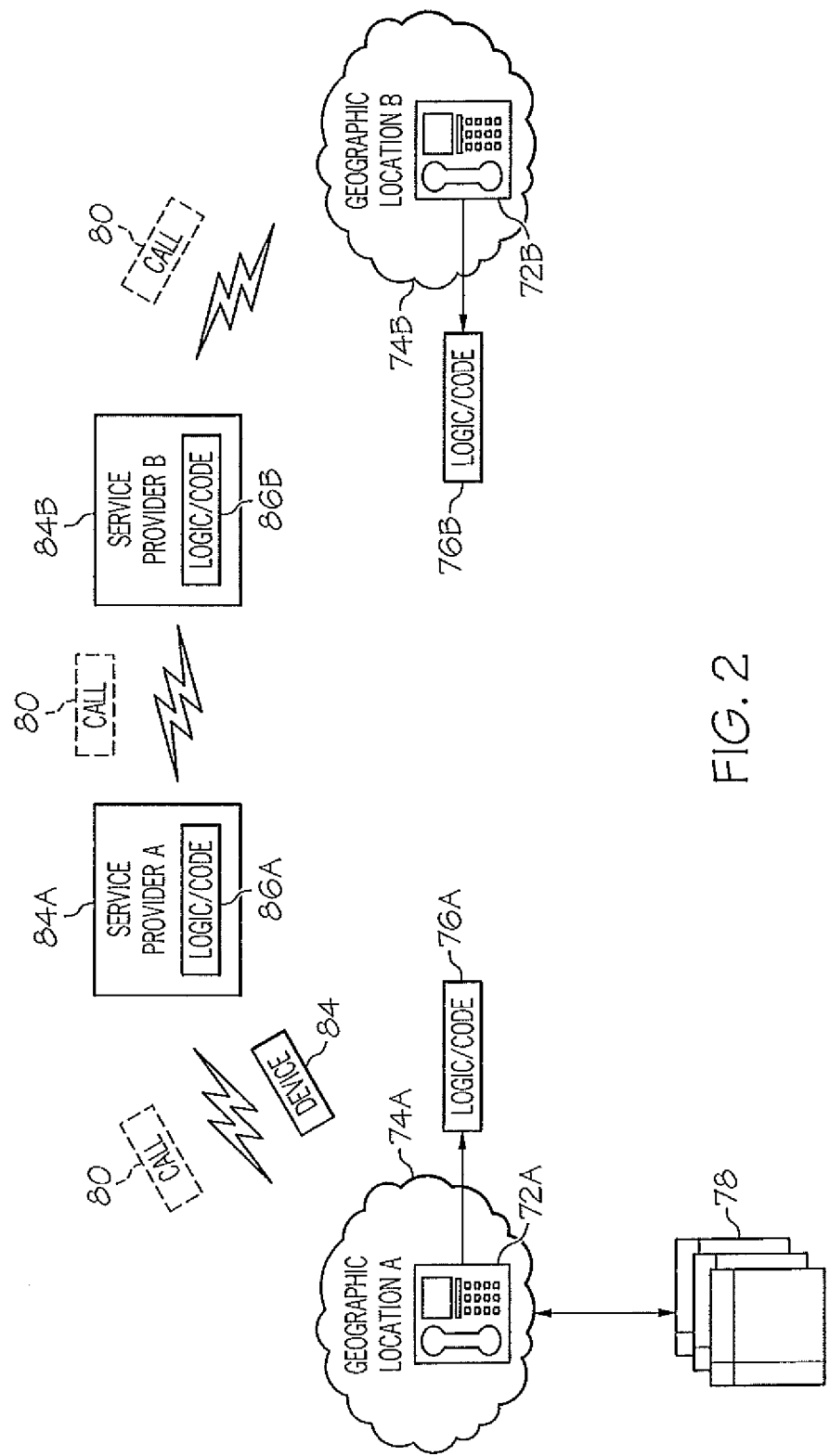
FIG. 2 depicts a process flow diagram according to an embodiment of the present invention.

Referring now to FIG. 2, telephone optimization environment 70 according to an embodiment of the present invention is shown. As depicted, an intended telephone call 80 is placed from a first telephone (also referred to as telephone system) 72A in a first geographic location 74A to a second telephone 72B in a second geographic location 74B. In general, telephone call 80 will be facilitated by one or more telephone service providers/carriers 84A-B. Telephone systems 72A-B can include/implement program code and/or logic 76A-B (similar to modules 42 of utility 40 of FIG. 1). Similarly, service providers 84A-B can also include/implement program code and/or logic 86A-B (similar to modules 42 of utility 40 of FIG. 1). It is understood that although two telephones 72A-B and two service providers/carriers 84A-B are shown, this need not be the case. Rather environment 70 and the teachings recited herein could support any quantity thereof.

Regardless (as will be further described below), under environment 70, an outgoing telephone number will be captured from intended telephone call 80. Based on the outgoing telephone number, a geographic region 74B to which intended telephone call 80 is being placed may be identified (e.g., based on an area code, country code, or the like, associated with the outgoing telephone number). A set (at least one) of information tables 78 may be accessed to identify a calling plan resulting in a lowest price for placing intended telephone 80. To this extent the set of information tables comprise information associating geographic regions with calling plans. Once an optimal calling plan has been identified, intended telephone call 80 may be implemented/connected according to the calling plan and a set of dialing instructions also contained in set of information tables 78.

In general, the calling plan can comprise and/or implement a particular calling card (which would result in a lowest rate). Moreover, set of information tables 78 can be populated based upon user preferences, historical data, etc. As will be further described below, the outgoing telephone number can be captured using at least one of the following techniques/approaches: logic 76A associated with telephone system 74A from which intended telephone call 80 is made; a device 82 (e.g., containing logic/code) implemented between telephone system 74A and a telephone service provider 84A that is supporting intended telephone call 80 (device 82 could be located anywhere within environment 70 between telephone 72A and telephone 72B), and/or logic 86A or 86B associated with a telephone service provider 84A or 84B that is supporting intended telephone call 80. In addition, the calling plan can be identified based upon at least one of the following: a set of user preferences, a cost for intended telephone call 80, historical telephone call information; or an account balance associated with a user of the calling plan.

Telephone Number Detection Methods

As indicated above, environment 70 allows for an outgoing telephone number for an intended telephone call to be captured. There are multiple methods that can be employed to capture the target telephone number and apply the routing logic.

Phone Integration: This approach implements program logic 76A within telephone 74A (e.g., before the Dual-Tone Multi-Frequency (DTMF) signals are sent). Long distance numbers entered can be evaluated, and, after applying the routing logic, an alternative DTMF signal stream can be sent downstream.

End point capture: Under this approach, device 82 is implemented between telephone 74A and the telephone service provider/carrier 84A. This could be wired or wireless but would most often be used to accommodate existing telephones that do not have this function already incorporated. In one illustrative implementation, an RJ-11 cable could run from the telephone 72A to device 82 and then another RJ-11 cable could connect device 82 to any remaining circuitry (e.g., a modular wall jack). Device 82 would monitor the DTMF tones entered at telephone 72A. If certain long distance telephone numbers (denoted by country codes or long distance strings) are detected, then the logic (described below) can be applied within device 82 and a second string of DTMF tones could be sent downstream.

Service Provider Integration: Under this approach, telephone service provider/carrier 86A and/or 86B could comprise routing logic 86A and/or 86B and provide this as a service on their switches. In this approach, a consumer could input calling card(s) or the like into a website, which registers calling card information with the telephone service provider 84A and/or 84B. The consumer could then use telephone 72A to place any calls. Under this embodiment, a corresponding telephone number and DTMF signal stream could be sent to telephone service provider 84A and/or 84B which then applies the routing logic 86A and/or 86B.

Routing Logic

Routing logic describes the approaches for determining which calling card/plan to use. There are multiple factors that can affect this determination. Some of these factors include: (1) user preference; (2) cost; (3) historical or typical call volumes; and (4) individual account balance.

User preference: This factor ensures that there is an element of control from the end user. It may be that some calling cards offer additional benefits (airline miles, restaurant discounts, volume discounts, etc.) that are unknown to the system. For this reason, it might be beneficial to utilize one card in preference to another.

Cost: Cost is usually one important factor in determining the optimal calling card to use. The routing logic method described below in conjunction with FIG. 5 will determine the cheapest method for a call to the target telephone number.

Historical call volume: This factor will use logs and history tied in with the time of day, day of week, and other events (holidays, etc) to associate a time with the current call in progress. It should be noted that some calls may be long in duration, and this could affect which card is chosen to match this anticipated factor. Calls for User A on Thanksgiving Day to Destination 1 may, for example, average 120 minutes, whereas a call to that same destination on the same day of the week at the same time of day might average 15 minutes any other day of the year.

Account Balance: Used in conjunction with historical call volume, the account balance should be considered by the logic because if a call is anticipated to be 30 minutes in length, then the routing logic will favor cards that have at least 30 minutes of time left in the card's balance. Used with the anticipated call length, the routing logic can select a card that won't disrupt the call or end it early.

Auction Methodology

This approach can provide an alternatively to the routing logic method described below in conjunction with FIG. 5. Specifically, an auction methodology can reduce and/or eliminate the need for calling cards and allows any service provider to bid for the consumers use on a per call basis. Instead of buying calling cards and entering them into a system, the user can sign up for a service that uses any of the telephone number capture methods listed above and then simply dial an intended destination. At one of the capture points, this auction method then contacts service providers that have capabilities for the destination number and places a bid for the consumer auction. The lowest priced provider will typically win. Other factors could come into play such as service provider reliability and line quality.

Volume Discounts: Part of the auction parameters published by the consumer could include an intended call's duration. Some carriers will give a larger discount rate if they can expect a longer duration call.

Graduated Discounts: Some telephone service providers could publish a stepped discount rate, essentially saying for a-b minutes Rate 1 applies, c-d minutes Rate 2 applies, and so on. The historical call volume routing method described hereinabove could be used to target the most likely call duration and then match the lowest price.

Combinations of the auction method and the statically entered pre-purchased calling cards described hereinabove could also be employed.

Illustrative Information Table(s)

Figure 3:
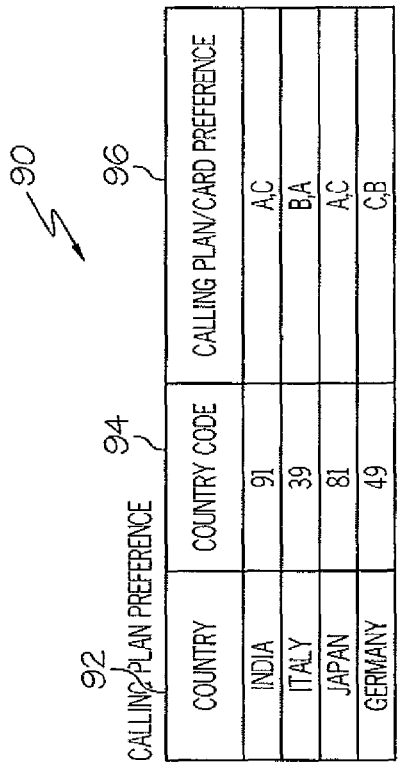
FIG. 3 depicts an information table according to an embodiment of the present invention.
Figure 4:
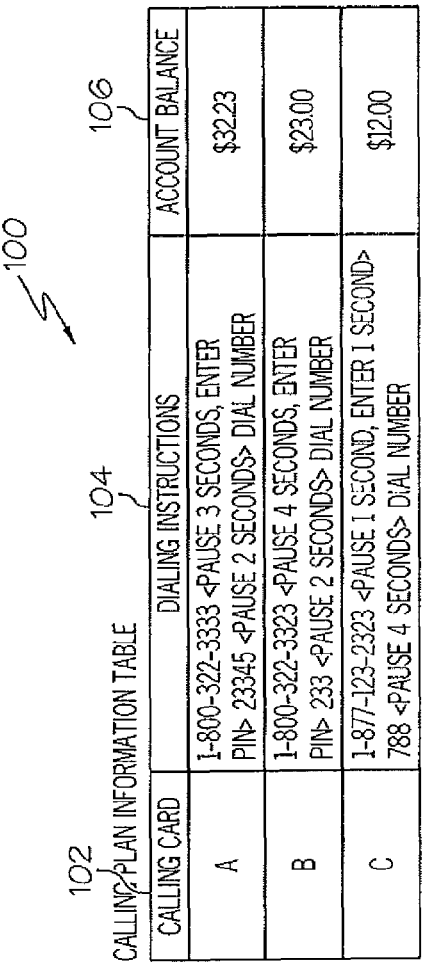
FIG. 4 depicts another information table according to an embodiment of the present invention.

An example of the content of the database tables 90 and 100 referenced above when placing a call are shown in FIGS. 3-4. Specifically, FIG. 3 shows an information table 90 that associates counties 92 with country codes 94 and calling plan/card preferences 96 (e.g., as set based upon user preferences, or by card/plan analysis performed by program 40 of FIG. 1 or and of the logic modules shown in FIG. 2). FIG. 4 shows an information table 100 that associates calling cards/plans 102 with dialing instructions 104 and account balances 106. These tables 90 and 100 will be referred to collectively in the example below.

As previously mentioned, when a telephone call is placed, the telephone number being dialed is analyzed to determine what location 92 is being called. This is determined by the country or area code of the number being dialed. The associated calling card/plan preference 96 for the number being dialed is determined by looking up the preference in the calling card preference table 90. In one embodiment, the calling card preference 96 may comprise multiple entries, where a secondary preference may be used if account balance 106 of the primary preference has been exhausted. A user could pre-populate the calling card preference table 90 with the calling card preference data based on knowledge of what it costs to call a given country. For example, the rank of "A,C" for calling India in the calling card preference table 90 (FIG. 3) may be based on the fact that calling card A charges 0.10 per minute for calling India, whereas calling card C charges 0.14 per minute. This data may be manually populated or populated automatically by the data being retrieved periodically from the calling card companies (already available). The data to populate the calling card preference table can be built from the data retrieved from the calling card companies.

In another option, data in such tables as shown above could be updated dynamically via an open Application Programming Interface (API) by service providers, such that rates could be adjusted as providers' rate plans changed. By doing so, the user could be assured of having the most recent data available when assessing the cheapest available rate. Once the appropriate calling card to use for a given call is determined, the call can be placed using dialing instructions 104 that are preprogrammed in the telephone for the associated calling card. These dialing instructions 104 could include pausing instructions as well as pin entry instruction. The caller is abstracted from which calling card or rate plan is being used to place the call. In the former case, once a calling card account balance 106 (FIG. 4) has been exhausted (data which can be calculated in the telephone by a timer), use of the card when placing a call can be stopped until the calling card is recharged.

Figure 5:
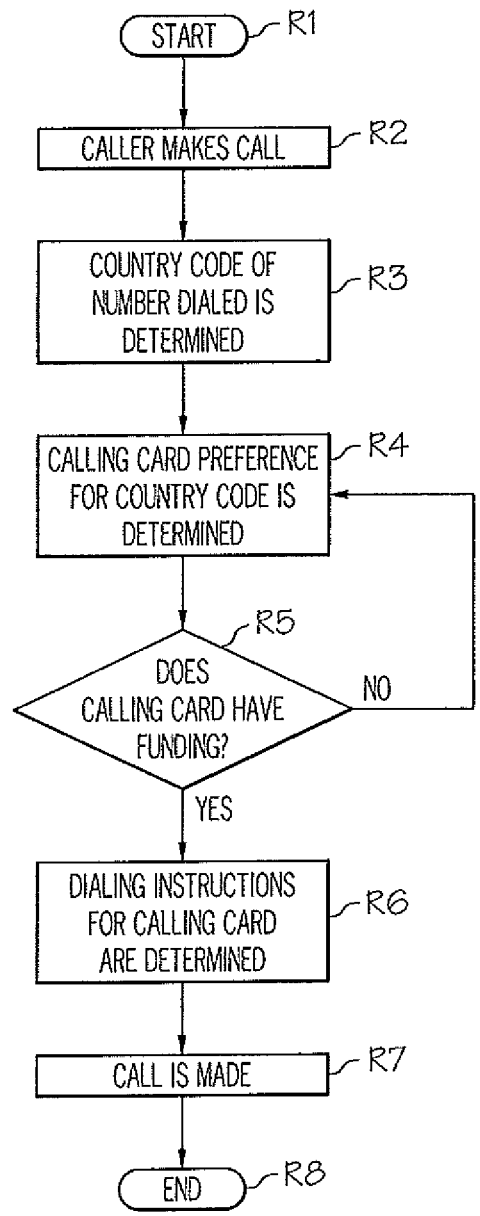
FIG. 5 depicts a method flow diagram according to an embodiment of the present invention.

Referring now to FIG. 5, a first method flow diagram according to an embodiment of the present invention is shown. In step R1, the process is started and a caller makes a call in step R2. In step R3, the country code of the number dialed is identified. Based on the geographic location of the call (as determined from the country code and/or area code), a calling plan/card preference is determined from table 90 in step R4. In step R5, it is determined whether the calling plan/card identified has sufficient funding to make the call as determined from account balance 106 of table 100. If not, another card/plan is chosen in step R5. If so, the dialing instructions 104 corresponding thereto are determined in step R6, and the call is placed according thereto in step R7 before the process ends in step R8.

Figure 6:
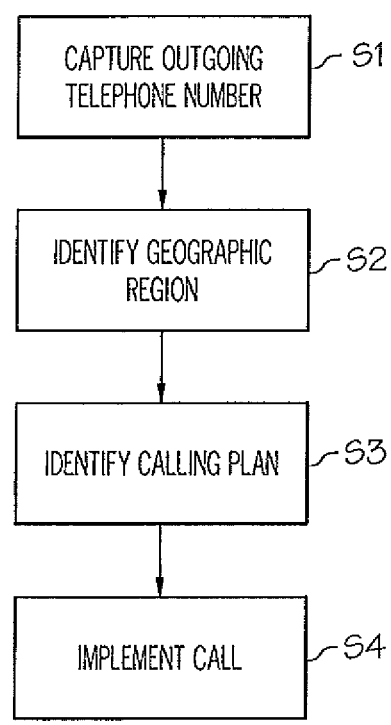
FIG. 6 depicts another method flow diagram according to an embodiment of the present invention.

Referring now to FIG. 6, another method flow diagram according to an embodiment of the present invention is shown. In step S1, an outgoing telephone number from an intended telephone call is captured. In step S2, a geographic region to which the intended telephone call is being placed is identified. In step S3, a calling plan/card resulting in a lowest price for placing the intended telephone call is identified based on at least one information table. As mentioned above, the at least one information table associates geographic regions with calling plans. In step S4, the intended telephone call is implemented according to the calling plan/card and a set of dialing instructions also contained in the at least one information table.

While shown and described herein as a telephony services optimization solution, it is understood that the invention further provides various alternative embodiments. For example, in one embodiment, the invention provides a computer-readable/useable medium that includes computer program code to enable a computer infrastructure to provide telephony services optimization functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide telephony services optimization functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for providing telephony services optimization functionality. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for optimizing telephony services, comprising:
    capturing an outgoing telephone number from an intended telephone call;
    identifying a geographic region to which the intended telephone call is being placed;
    requesting bids from service providers that have capabilities for implementing the destination number to the identified geographic region;
    receiving the bids from the service providers;
    selecting one service provider from the service providers based on the bids; and
    implementing the intended telephone call with the selected one service provider.

2. The method of claim 1, wherein one service provider is selected based on a price contained in each of the received bids.

3. The method of claim 1, the geographic location being identified based on a country code or an area code associated with the outgoing telephone number.

4. The method of claim 1, the outgoing telephone number being captured using at least one of the following: logic associated with a telephone from which the intended telephone call is made; a device implemented between the telephone and a telephone service provider that is supporting the intended telephone call, or logic associated with a telephone service provider that is supporting the intended telephone call.

5. The method of claim 1, wherein parameters of the request for bids comprise at least one of a volume discount and a graduated discount based an anticipated duration of the call.

6. The method of claim 5, wherein the parameters of the request for the bids also contain pre-purchased calling plan information.

7. The method of claim 6, wherein the pre-purchased calling plan is identified based upon at least one of the following: a set of user preferences, a cost for the intended telephone call, historical telephone call information; or an account balance associated with a user of the calling plan.

8. The method of claim 1, wherein a service solution provider provides a computer infrastructure that performs the method for one or more consumers.

9. A system for optimizing telephony services, comprising:
    a bus;
    a processor coupled to the bus; and
    a memory medium coupled to the bus, the memory medium comprising instructions to:
        capture an outgoing telephone number from an intended telephone call;

identify a geographic region to which the intended telephone call is being placed;

request bids from service providers that have capabilities for implementing the destination number to the identified geographic region;

receive the bids from the service providers;

select one service provider from the service providers based on the bids; and implement the intended telephone call with the selected one service provider.

10. The system of claim 9, wherein one service provider is selected based on a price contained in each of the received bids.

11. The system of claim 9, the geographic location being identified based on a country code or an area code associated with the outgoing telephone number.

12. The system of claim 9, the outgoing telephone number being captured using at least one of the following: logic associated with a telephone from which the intended telephone call is made; a device implemented between the telephone and a telephone service provider that is supporting the intended telephone call, or logic associated with a telephone service provider that is supporting the intended telephone call.

13. The system of claim 9, wherein parameters of the request for the bids comprise at least one of a volume discount and a graduated discount based on an anticipated duration of the call.

14. The system of claim 13, wherein the parameters of the request for the bids also contain pre-purchased calling plan information.

15. The system of claim 14, wherein the pre-purchased calling plan is identified based upon at least one of the following: a set of user preferences, a cost for the intended telephone call, historical telephone call information; or an account balance associated with a user of the calling plan.

16. A computer program product for optimizing telephony services, the computer program product comprising a computer readable hardware storage device, and program instructions stored on the computer readable hardware storage device, to:

capture an outgoing telephone number from an intended telephone call;

identify a geographic region to which the intended telephone call is being placed;

request bids from service providers that have capabilities for implementing the destination number to the identified geographic region;

receive the bids from the service providers;

select one service provider from the service providers based on the bids; and implement the intended telephone call with the selected one service provider.

17. The computer program product of claim 16, wherein the one service provider is selected based on a price contained in each of the received bids.

18. The computer program product of claim 16, the geographic location being identified based on a country code or an area code associated with the outgoing telephone number.

19. The computer program product of claim 18, the outgoing telephone number being captured using at least one of the following: the outgoing telephone number being captured using at least one of the following: logic associated with a telephone from which the intended telephone call is made; a device implemented between the telephone and a telephone service provider that is supporting the intended telephone call, or logic associated with a telephone service provider that is supporting the intended telephone call.

20. The computer program product of claim 13, wherein parameters of the request for the bid comprise at least one of a volume discount and a graduated discount based on an anticipated duration of the call.

* * * * *